(12) United States Patent
Sauve et al.

(10) Patent No.: US 8,127,253 B2
(45) Date of Patent: Feb. 28, 2012

(54) PREDICTIVE CURSOR INTERACTION

(75) Inventors: Aaron J. Sauve, Seattle, WA (US);
Anthony T. Chor, Bellevue, WA (US);
Stephan Hoefnagels, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 288 days.

(21) Appl. No.: 11/243,909

(22) Filed: Oct. 5, 2005

(65) Prior Publication Data

US 2007/0079259 A1      Apr. 5, 2007

(51) Int. Cl.
*G06F 3/048* (2006.01)
*G06F 3/00* (2006.01)

(52) U.S. Cl. ......... 715/856; 715/711; 715/729; 715/859
(58) Field of Classification Search .................. 715/711, 715/859, 726, 805, 729
See application file for complete search history.

(56) References Cited

U.S. PATENT DOCUMENTS

| | | | |
|---|---|---|---|
| 5,287,448 A | 2/1994 | Nicol et al. | |
| 5,546,521 A | 8/1996 | Martinez | |
| 5,754,176 A | 5/1998 | Crawford | |
| 6,046,726 A | 4/2000 | Keyson | |
| 6,229,524 B1 | 5/2001 | Chernock et al. | |
| 6,244,956 B1 | 6/2001 | Nakayama et al. | |
| 6,362,842 B1 | 3/2002 | Tahara et al. | |
| 6,437,800 B1 * | 8/2002 | Malamud et al. | 715/711 |
| 6,560,605 B2 * | 5/2003 | Albers et al. | 707/10 |
| 7,111,236 B1 * | 9/2006 | Isensee et al. | 715/528 |
| 2003/0079224 A1 * | 4/2003 | Komar et al. | 725/32 |
| 2003/0204815 A1 * | 10/2003 | Edwards et al. | 715/513 |
| 2005/0125727 A1 * | 6/2005 | Ramachandran | 715/520 |
| 2006/0107234 A1 * | 5/2006 | Tudor et al. | 715/821 |

OTHER PUBLICATIONS

Harald Weinreich and Winfired Lamersdorf Concepts for improved visualization of Web link attributes Computer Networks 33 (2000) 403-416.*
Harald Weinreich, Winfired Lamersdorf, Haetmut Obendorf The Look of the Link—Concepts for the User Interface of Extended Hyperlinks 2001 ACM 19-28.*
GP Fitzpatrick and TR Haynes User-Controlled Display of Hypermedia Links via Mouse Location IBM TDB Aug. 1, 1993.*
Theodorich Kopetzky and Max Muhlhauser "Visual preview for link traversal on the World Wide Web" (1999) pp. 447-454.*
GiD Support, "GiD User Interface," website at http://gid.cimne.upc.es/support/gid_4.subst; printed Oct. 5, 2005.

(Continued)

*Primary Examiner* — Adam M Queler
*Assistant Examiner* — Andrea Long

(57) ABSTRACT

Various embodiments can add predictability to user interactions with links that they encounter. In addition to adding predictability, various embodiments can enable a user to affect or change the behavior that is associated with a particular link selection. In at least some embodiments, a user is provided with discernible indicia that provide an indication of a behavior associated with selecting a particular link. In at least some embodiments, software executing as part of an end user application makes a determination that a user is about to or is likely to select a particular link. Once the application makes this determination, that application can cause the discernible indicia to be presented to the user. Such indicia provide the user with an indication of the behavior that is to be performed in the event the user selects the particular link of interest.

10 Claims, 4 Drawing Sheets

OTHER PUBLICATIONS

Kavi, "Getting Started with Kavi Software: Menus; Tooltips," website at http://www.oasis-open.org/khelp/dotorg/user_help/html/sul.html, printed Oct. 5, 2005, 6 pages.

Lambda Research Corporation, "User Interface," website at http://www.lambdares.com/products/oslo/userinterface.phtml, printed Oct. 5, 2005, 2 pages.

McGavin, "SAMoN: A Semiotic Abstract Model of Navigation," A thesis, Victoria University of Wellington, 2004.

Multimedia Creative, "Guidelines for Designing a Useable Graphical Interface," website at http://www.multimediacreative.com.au/articles/interface.htm, printed Oct. 5, 2005, 3 pages.

* cited by examiner

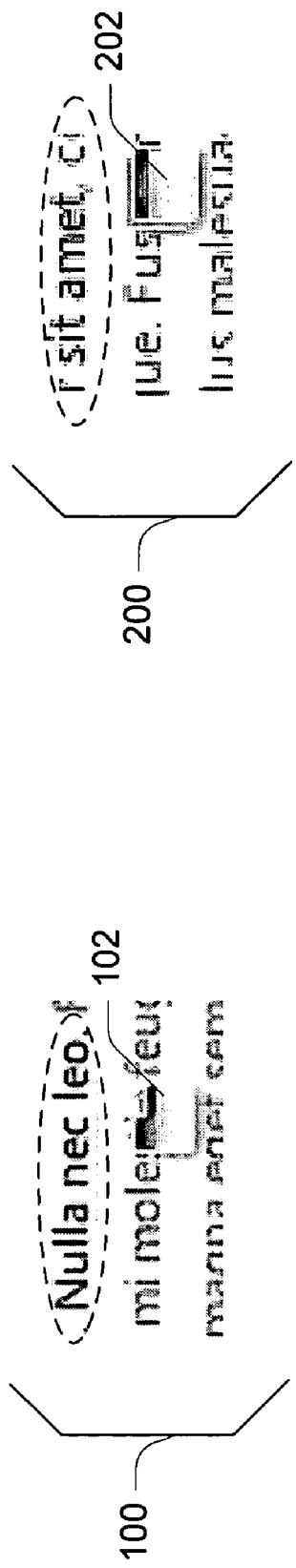
Fig. 1
Fig. 2
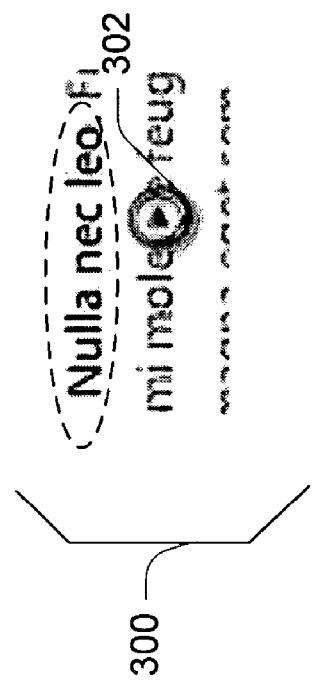
Fig. 3

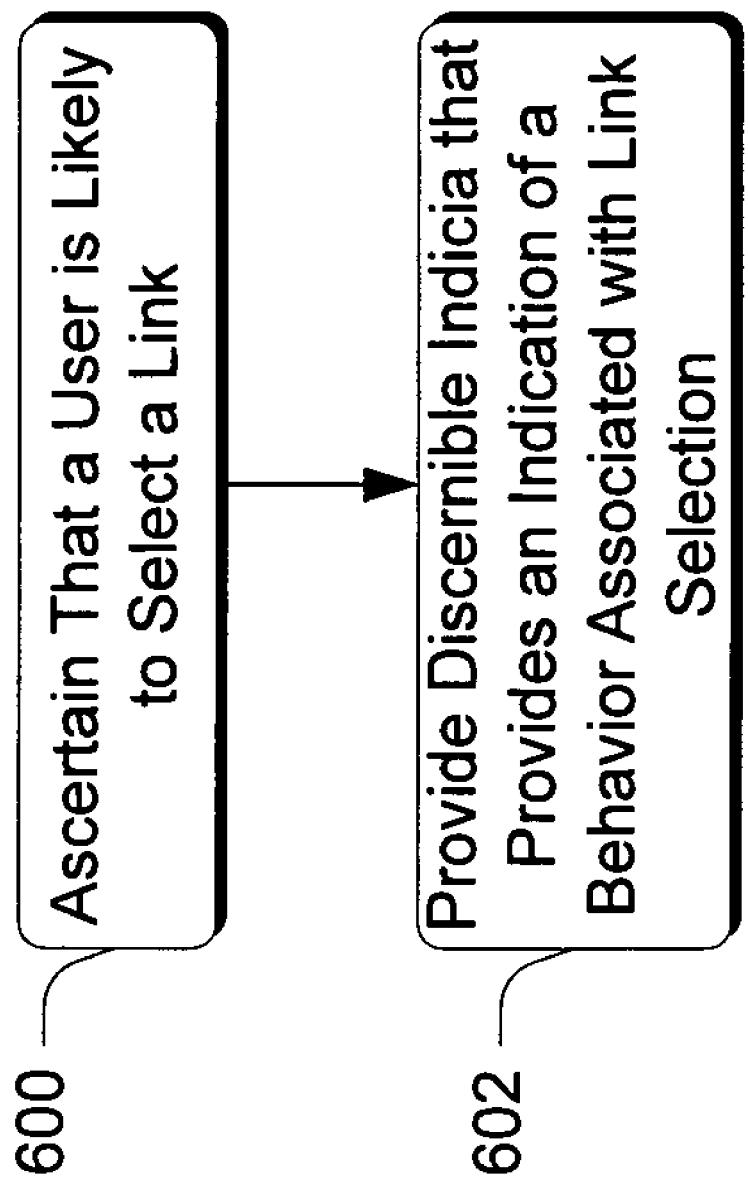

PREDICTIVE CURSOR INTERACTION

BACKGROUND

The action of clicking a link on for example, a web page, can produce many different behaviors and as such is not predictable. After clicking a link a new window might be opened, a new tab might be created, another application might launch, or the application (if a web browser) might navigate in place. As such, end users do not have a good way of predicting which behavior will occur.

SUMMARY

Various embodiments can add predictability to user interactions with links that they encounter. In addition to adding predictability, various embodiments can enable a user to affect or change the behavior that is associated with a particular link selection. In at least some embodiments, a user is provided with discernible indicia that provide an indication of a behavior associated with selecting a particular link. In at least some embodiments, software executing as part of an end user application makes a determination that a user is about to or is likely to select a particular link. Once the application makes this determination, that application can cause the discernible indicia to be presented to the user. Such indicia provide the user with an indication of the behavior that is to be performed in the event the user selects the particular link of interest.

BRIEF DESCRIPTION OF THE DRAWINGS

FIG. 1 illustrates an exemplary visually-discernible icon in accordance with one embodiment.

FIG. 2 illustrates an exemplary visually-discernible icon in accordance with one embodiment.

FIG. 3 illustrates an exemplary visually-discernible icon in accordance with one embodiment.

FIG. 6 is a flow diagram that describes steps in a method in accordance with one embodiment.

DETAILED DESCRIPTION

Overview

Figure 1A:
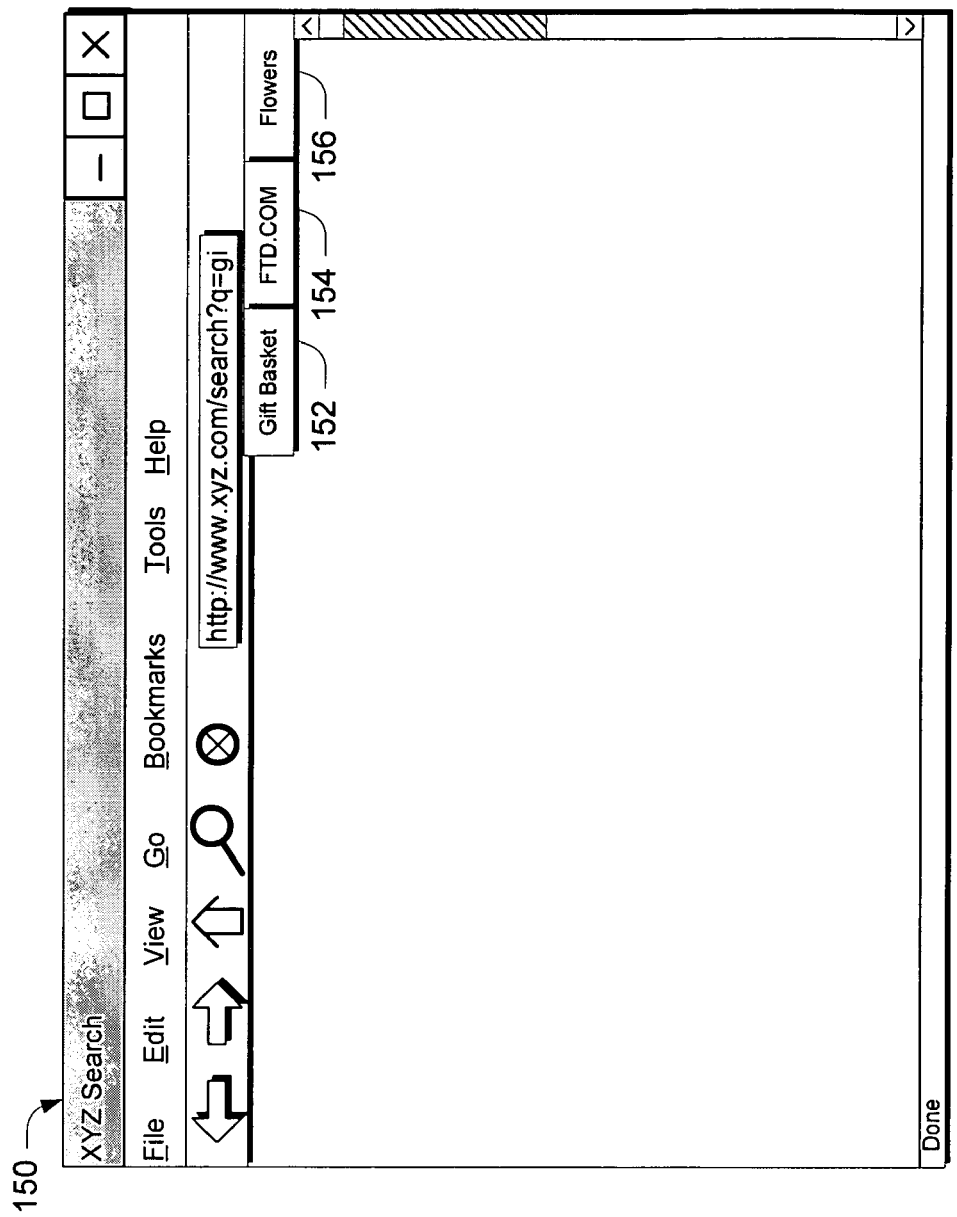
FIG. 1A illustrates an exemplary web browser window with three tabs.

Various embodiments described in this document provide a user with discernible indicia that provide an indication of a behavior associated with selecting a particular link. In at least some embodiments, software executing as part of an end user application makes a determination that a user is about to or is likely to select a particular link. Once the application makes this determination, that application can cause the discernible indicia to be presented to the user. Such indicia provide the user with an indication of the behavior that is to be performed in the event the user selects the particular link of interest.

In the examples described below, the discernible indicia resides in the form of visually-discernible indicia. It is to be appreciated and understood, however, that other user-discernible indicia could be used without departing from the spirit and scope of the claimed subject matter. For example, audibly-discernible indicia might be used in place of or in combination with the visually-discernible indicia.

In at least some embodiments, the indicia can be presented seemingly instantly, such as when the application determines that a link selection is likely to be made. In yet other embodiments, the indicia can be presented in a delayed fashion, for reasons that are discussed below. In further embodiments, the indicia can be displayed responsive to other user actions.

In other embodiments, the visual indicia that are displayed for the user provide the user with the ability to change what can be considered as a default behavior associated with selecting the link. Hence, the user is given flexibility in selecting the way in which data associated with the link is consumed.

In the discussion that follows, a section entitled "Visually-discernible Indicia as a Visual Indication of a Behavior" describes the general notion of using visual indicia to provide the user with a visual indication as to what is going to happen if the user selects a particular link. Following this, a section entitled "Instantaneous Display" describes one embodiment in which the display of the indicia takes place seemingly instantaneously; and, a section entitled "Delayed Display" describes an embodiment in which the display of the indicia takes place in a delayed manner. Following this, a section entitled "Display on Mouse Down" describes an embodiment in which the display of the indicia takes place when the user depresses a mouse button. A section entitled "Changing Default Behavior Associated with Link Selection" follows, and describes the notion of a user being able to change a default behavior associated with making a link selection. Finally, an "In Operation" section describes one specific implementation example.

Preliminarily, in the description below the various embodiments are described in the context of a specific end-user application in the form of a web browser. This is done to provide the reader with a particular context in which the embodiments can be employed. It is to be appreciated and understood that the embodiments described in this document can be employed in the context of other applications, other than web browsers, without departing from the spirit and scope of the claimed subject matter. Such other applications can include by way of example and not limitation, word processing applications, spreadsheet applications, email applications, visual presentation applications and the like.

Further, in the specific example that is described to provide context, the manner in which the user indicates that they are about to select a particular link is by hovering a visual input icon, such as cursor, over a particular link. It is to be appreciated and understood that other user indications can be utilized without departing from the spirit and scope of the claimed subject matter.

Visually-discernible Indicia as a Visual Indication of a Behavior

There are a number of different behaviors that can occur when a user selects a particular link. For example, a navigation can occur in place, meaning that in the web browser context, a new web page is presented to the user in the browser window that they currently have open. Alternately or additionally, selecting a link can cause a new window to be opened or can cause a new foreground or background tab to be opened in the browser. Further, other behaviors can include launching an application that then takes some action. For example, if the link is associated with a multimedia file, then a multimedia player application may likely be launched as a result of the user selecting the link. In the past, when the user has been faced with a link and a selection, they did not know what behavior was going to occur as a result of selecting the link.

Consider now FIG. 1 which shows an excerpt of text 100, such as that which might appear as part of a displayed web page. In this example the user has hovered their cursor over the dash-encircled text indicating that they may likely select the link associated with that text. Responsive to detecting this hovering activity, the application—in this case the web browser—displays visually-discernible indicia in the form of a tab icon 102. Tab icon 102 provides a visual indication that tells the user that if they select this link, the behavior that is going to be performed is that a new tab is going to be opened in the user's web browser. As an example of what a tab looks like, consider FIG. 1A which shows an exemplary browser window 150 and three exemplary tabs—152, 154 and 156. Each tab in this example is associated with a different web page.

Consider now FIG. 2 which shows an excerpt of text 200, such as that which might appear as part of a displayed web page. In this example the user has hovered their cursor over the dash-encircled text indicating that they may likely select the link associated with that text. Responsive to detecting this hovering activity, the application—in this case the web browser—displays visually-discernible indicia in the form of a new window icon 202. New window icon 202 provides a visual indication that tells the user that responsive to selecting the link associated with the text, the behavior that is going to be performed is that a new window is going to be opened.

Consider now FIG. 3 which shows an excerpt of text 300, such as that which might appear as part of a displayed web page. In this example the user has hovered their cursor over the dash-encircled text indicating that they may likely select the link associated with that text. Responsive to detecting this hovering activity, the application—in this case the web browser—displays visually-discernible indicia in the form of a media player icon 302. Media player icon 302 provides a visual indication that tells the user that responsive to selecting the link associated with the text, the behavior that is going to be performed is that a media playing application is going to be opened up.

It is to be appreciated and understood that any number of behaviors can be performed and that each can have its own suitable visually-discernible indicia displayed for the user. Accordingly, it is not the intent of this document to exhaustively describe each and every behavior or its associated indicia. Accordingly, other behaviors and indicia can be used without departing from the spirit and scope of the claimed subject matter.

In addition, while visually-discernible indicia in the form of icons have been described, it is to be appreciated and understood that other indicia can be used without departing from the spirit and scope of the claimed subject matter. For example, such visually-discernible indicia may include text, used solely or in conjunction with an icon.

Having described the notion of visually-discernible indicia that is used as an indication of an associated behavior, consider now some various ways in which the indicia can be presented to a user.

Instantaneous Display

In one embodiment, the visually-discernible indicia can be displayed in a seemingly instantaneous manner when a user provides an indication that they will likely select a particular link. For example, as soon as a user hovers their cursor over a particular link, an associated icon may instantaneously appear for the user to view.

Delayed Display

In other embodiments, when a user hovers their cursor over a particular link, there may be a predefined delay of time before the visually-discernible indicia is presented to the user. For example, once the user hovers their cursor over a particular link, a few seconds may elapse before the indicia are displayed. This embodiment can be employed in the context of web pages that include a large number of links to prevent a user from being overwhelmed with the number of indicia that are displayed when, for example, the user moves their cursor around the page.

Display on Mouse Down

In other embodiments, the indicia can be displayed when the user hovers the cursor over the link and presses down on a mouse key. That is, presentation of the indicia happens upon a "mouse down" activity. Then, when the mouse button is released, the selection-induced behavior occurs. In this particular embodiment, the user can escape out of the pending behavior by navigating the mouse off of the link.

Changing Default Behavior Associated with Link Selection

In some embodiments, a user is provided with an opportunity to change a default behavior associated with a particular link. As an example, consider the following.

Assume that a user hovers the cursor over a link that is associated with a new web page. In this instance, a default behavior associated with the link might be to perform an in-place navigation. In this embodiment, by using one or more so-called "modifiers", the user can change the behavior that is to occur. Specifically, assume that the user does not wish to have an in-place navigation occur, but would rather prefer to have a new tab opened in their browser. In this example, the user might hold down the CTRL key while hovering the cursor over the link. In this case, a new tab icon might be presented to indicate to the user that the behavior associated with selecting that link will be to open a new browser tab and associate that tab with the web page of interest.

Assume instead that the user forgets for a moment the particular modifier that is used to open a new tab. In this instance, the user might only remember a set of modifiers that can be used to modify the behavior associated with link selection. In this instance, the user might hover their cursor and hold down the SHIFT key. In this case, the user might be presented with a new window icon. Recognizing that this is not their desired selection, the user might then try holding the CTRL key at which time the appropriate icon is presented and the user can have the new tab opened in their current browser window.

Figure 4:
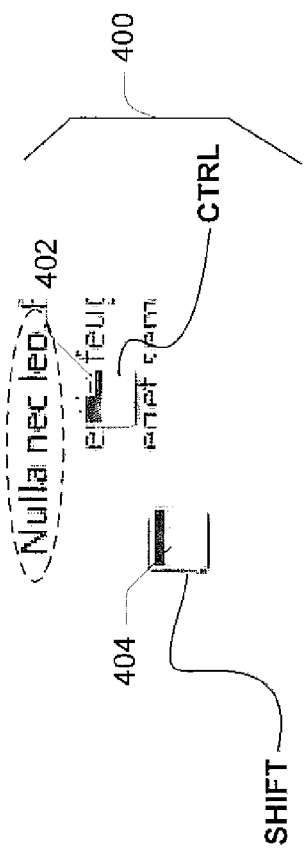
FIG. 4 illustrates presentation of exemplary visually-discernible icons in accordance with one embodiment.

As an example, FIG. 4 shows an exemplary excerpt of text 400 associated with a link, and the various icons 402, 404 associated with the modifiers in the example above.

Figure 5:
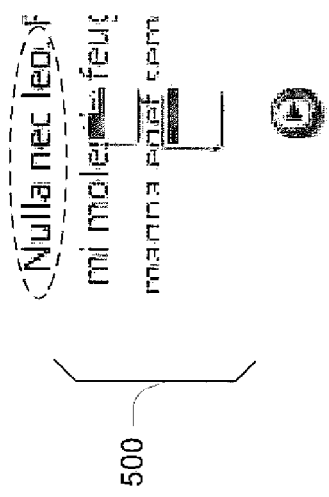
FIG. 5 illustrates presentation of exemplary visually-discernible icons in accordance with one embodiment.

Consider now the situation in which, rather than having the user access the icons by using modifiers, once the user hovers their cursor over a particular link, they are presented with a plurality of icons that provide visual indications as to the various behaviors that can be caused by selecting a link. As an example, consider FIG. 5 which illustrates an excerpt of text 500 associated with a link, and a plurality of icons that are simultaneously presented to the user from which to select. Note that in this embodiment, as in the embodiments described above, the user need not provide a mouse input, other than hovering the cursor, in order to have the indicia exposed to them. That is, the indicia can be exposed to the user independent of the user clicking the mouse, when the mouse is used as the input device. This effectively provides the user with an entry point to making their selection which is not a right-click, context menu-type action.

FIG. 6 is a flow diagram that describes steps in a method in accordance with one embodiment. The method can be implemented in connection with any suitable hardware, software, firmware or combination thereof. In but one embodiment, the method can be implemented by an end-user application. Examples of end-user applications include by way of example and not limitation, word processing applications, spreadsheet applications, web browser applications and the like. In these contexts, the steps described below typically reside in the form of computer-readable instructions that reside on some type of computer-readable media.

Step 600 ascertains that a user is likely to select a particular link. This step can be performed in any suitable way. In but one embodiment, the likelihood of link selection is ascertained when a user hovers their cursor over a particular link. One way that a user can hover their cursor is by using a mouse. It is to be appreciated and understood that other input devices, such as a finger pad, point device and the like, can be used without departing from then spirit and scope of the claimed subject matter.

Step 602 provides, responsive to determining the likely link selection, discernible indicia that provides an indication to the user of a behavior that is associated with selecting that link. Any suitable user-discernible indicia can be provided, such as audibly-discernible, visually-discernible or both.

For example, in embodiments that utilize visually-discernible indicia, this step can be performed by displaying a single icon—either instantaneously or in a delayed fashion. Alternately or additionally, this step can be performed by displaying multiple icons. In addition, in the multiple icon embodiments, such can be displayed together or separately. When displayed separately, the icons can be displayed when, for example, a user uses modifiers, such as those described above.

In Operation

In operation, code executing in the application detects that the user is hovering the cursor over a link. In addition, a link typically includes or is associated with a character string that includes characters that can provide a hint that is associated with the behavior that is performed upon selecting the link. For example, the hint may come in the form of a file extension (e.g., ".wmv") or other parameters which provide a hint of the behavior that will be performed upon link selection (e.g. launching a media player). Other hints can be provided in the form of certain parameters that are associated with the link, such as "window.open" or <A> tag parameters, as will be appreciated by the skilled artisan. In addition, a site itself could provide hints about the behavior that will occur.

Accordingly, a set of hints are supported and are associated with a set of behaviors or actions. Further, a set of indicia are associated with the set of actions and can be maintained in the local registry. Once the particular hint is ascertained, the action can be ascertained and the code can then look in the local registry to retrieve and display the icon for the user.

CONCLUSION

The embodiments described above add predictability to user interactions with links. In addition to adding predictability, various embodiments can enable a user to affect or change the behavior that is associated with a particular link selection.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
ascertaining, responsive to detecting a cursor hovered in a link-selecting position, that a user is likely to select a particular link; and
responsive to said ascertaining, providing multiple discernible indicia that provide an indication of behaviors associated with link selection, the multiple discernible indicia comprising visually-discernible graphical icons including icons associated with opening a new window, opening a new tab, or launching an application, wherein one or more of the visually-discernible graphical icons is displayed as a pictorial image that visually represents a behavior associated with the link selection, the visually discernable graphical icons further comprising:
a first user-selectable icon that, if selected, causes a default behavior associated with the link selection to occur; and
a second user-selectable icon that, if selected, causes an alternative behavior associated with the link selection to occur, the alternative behavior being alternative to the default behavior,
wherein, responsive to a user-provided modifier, at least one of the first user selectable icon or the second user-selectable icon is replaceable with a third user-selectable icon that comprises a different pictorial image visually representing a different alternative behavior and which, if selected, causes the different alternative behavior associated with the link selection to occur, the different alternative behavior being different from both the default behavior and the alternative behavior, the user-provided modifier comprising input from one or more keyboard keys, and each of the first, second, and third user-selectable icons corresponding to a different user-provided modifier that enables a respective one of the first, second, or third user-selectable icons to be displayed.

2. The method of claim 1, wherein the act of ascertaining is performed by ascertaining that the user has hovered the cursor, via a mouse, in the link-selecting position.

3. The method of claim 1, wherein said acts of ascertaining and providing are performed by an end user application.

4. The method of claim 1, wherein said act of providing is performed after a predefined delay after said act of ascertaining.

5. A computer-implemented method comprising:
ascertaining, responsive to detecting a cursor hovered in a link selecting position, that a user is likely to select a particular link on a web page; and
responsive to said ascertaining, displaying, with a web browser, visually discernible indicia that include an indication of a first alternative behavior associated with link selection, the visually discernible indicia comprising visually-discernible icons including an icon associated with opening a new tab and at least one icon associated with opening a new window or launching an application, the icon associated with opening a new tab including a visual simulation of a tabbed web page,
wherein displaying the visually discernable indicia further comprises displaying, responsive to a user-provided modifier, a user-selectable icon that, if selected, causes the first alternative behavior associated with the link selection to occur, the first alternative behavior being alternative to a default behavior associated with the link selection, the user-selectable icon being replaceable with a new icon corresponding to an additional user-provided modifier, the new icon being associated with a second alternative behavior that is associated with the link selection, the new icon comprising a pictorial image that visually represents the second alternative behavior and which is different than an additional pictorial image that visually represents the first alternative behavior, each of the visually discernible indicia corresponding to a different user-provided modifier that enables a respective one of the visually discernible indicia to be displayed.

6. The method of claim 5, wherein the act of ascertaining is performed by ascertaining that the user has hovered the cursor in the link-selecting position.

7. The method of claim 5, wherein said act of displaying is performed after a predefined delay after said act of ascertaining.

8. A computer-implemented method comprising:
ascertaining, responsive to detecting a cursor hovered in a link-selecting position, that a user is likely to select a particular link;
responsive to said ascertaining, providing discernible indicia that provide an indication of a behavior associated with link selection, the discernible indicia comprising user-selectable graphical icons including an icon associated with opening a new tab and at least one icon associated with opening a new window or launching a new application, the user-selectable graphical icons being associated with different behaviors associated with the link selection, the behaviors comprising a default behavior and an alternative behavior; and
providing the user with an option to change the default behavior associated with selecting the link by presenting one of the user-selectable graphical icons via selection of one or more keys on a keyboard, each of the user-selectable graphical icons corresponding to a different user-provided modifier that enables a respective one of the user-selectable graphical icons to be displayed, the one of the user-selectable graphical icons comprising a pictorial image that visually represents the default behavior and which is replaceable with a new user-selectable graphical icon responsive to a user-provided modifier, the new user-selectable graphical icon comprising a different pictorial image that visually represents the alternative behavior, the user-provided modifier including input from the one or more keys on the keyboard and the new user-selectable graphical icon being selectable to cause the alternative behavior to occur based on the user-provided modifier.

9. The method of claim 8, wherein said user-selectable icons are presented to the user responsive to the user hovering the cursor.

10. The method of claim 8, wherein the act of ascertaining is performed by ascertaining that the user has hovered the cursor, via a mouse, in the link-selecting position.

\* \* \* \* \*